(12) United States Patent
Yates

(10) Patent No.: US 6,183,795 B1
(45) Date of Patent: Feb. 6, 2001

(54) METHOD FOR PRODUCING SHATTERED PRESERVATIVE-FREE DRIED FRUIT OR VEGETABLE PIECES

(75) Inventor: Robert L. Yates, Yuba City, CA (US)

(73) Assignee: Sunsweet Growers, Inc., Sacramento, CA (US)

( * ) Notice: Under 35 U.S.C. 154(b), the term of this patent shall be extended for 0 days.

(21) Appl. No.: 09/225,627

(22) Filed: Jan. 5, 1999

Related U.S. Application Data

(63) Continuation-in-part of application No. 08/891,770, filed on Jul. 14, 1997.

(51) Int. Cl.⁷ .............................. A23L 1/212; A23L 3/36
(52) U.S. Cl. ..................... 426/385; 426/616; 426/524; 426/640
(58) Field of Search .................................. 426/385, 616, 426/640, 524

(56) References Cited

U.S. PATENT DOCUMENTS

| | | |
|---|---|---|
| 3,800,049 | 3/1974 | Larroche et al. . |
| 3,852,212 * | 12/1974 | Groening et al. . |
| 3,911,145 * | 10/1975 | Marion . |
| 4,341,744 * | 7/1982 | Brison et al. . |
| 4,762,725 * | 8/1988 | Player et al. . |
| 4,948,609 | 8/1990 | Nafisi-Movaghar ............... 426/321 |
| 5,554,406 | 9/1996 | Muenz et al. . |

FOREIGN PATENT DOCUMENTS

| | | |
|---|---|---|
| 43 34 322 A1 | 4/1995 | (DE) . |
| 2 608 922 | 12/1986 | (FR) . |
| 58-124942 | 8/1983 | (JP) . |
| WO91/01650 | 2/1991 | (WO) . |

OTHER PUBLICATIONS

Database Abstract. AN 80(08):J1151 FSTA from Report, Internation Federation of Fruit Juice Producers, Scientific–Technical Commission, No. 15, pp. 363–372. Author: Moutounet, 1978.*
Supplementary European Search Report ( EP 98 98 3221).
Database WPI, Section Ch, Week 199252, Derwent Publications, London, GB, XP 002142192, 15 Feb. 1992.

* cited by examiner

Primary Examiner—Anthony J. Weier
(74) Attorney, Agent, or Firm—Greenberg, Traurig, LLP

(57) ABSTRACT

A method of producing shattered, preservative-free dried fruit or vegetable pieces. Preferably, low moisture fruit is cryogenically frozen and the frozen fruit is then impacted (preferably using a roller mill or tumbler) to produce randomized, shattered fruit pieces (preferably having size primarily in the range from ¼ inch to ⅜ inch). The shattered fruit pieces are optionally dried (for example, while they are warmed in a warm air dryer) to reduce their moisture content to 22%–25% prior to packaging. In an optional, preliminary processing step, dried fruit is first rehydrated to a moisture content of 22%–30% (preferably 23%–25%) to produce low moisture fruit. The low moisture fruit is pitted and then frozen. The frozen, low moisture fruit is then shattered (and optionally then dried) in accordance with the invention. Other aspects of the invention are apparatus for producing shattered, preservative-free dried fruit or vegetable pieces, which include a dual pass roller mill or a tumbler for shattering the frozen plant material.

44 Claims, 3 Drawing Sheets

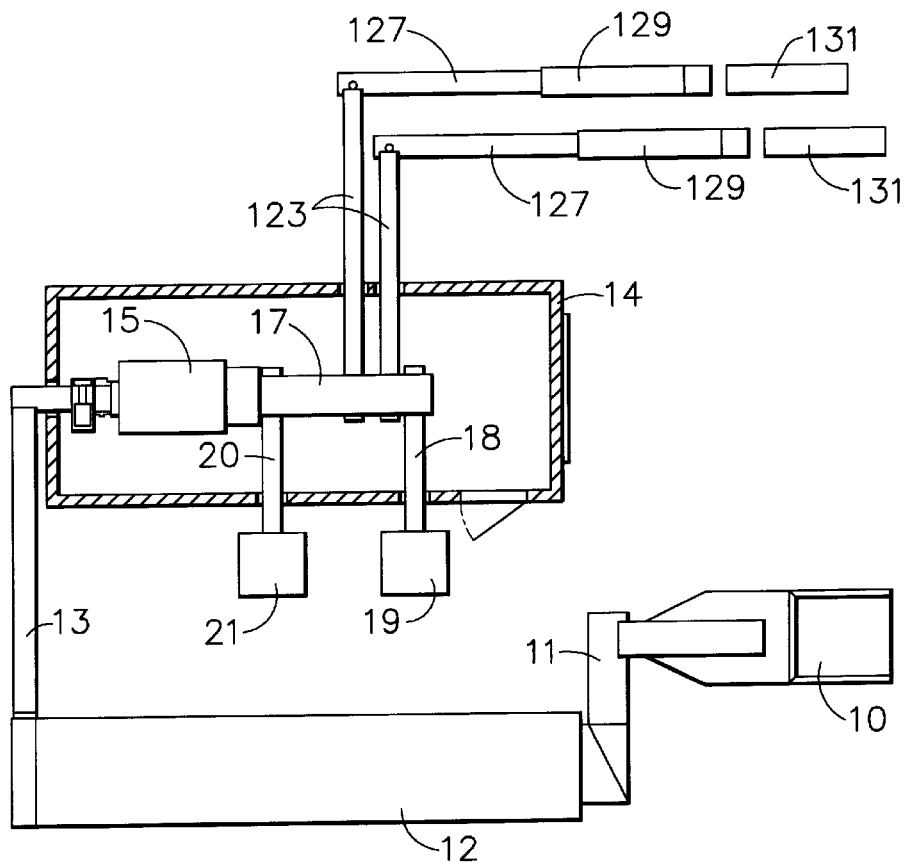
FIG. 3
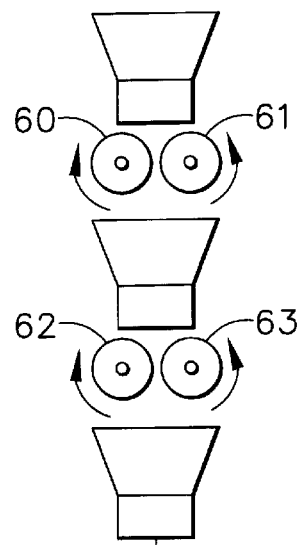
FIG. 4  TO GRADING SHAKER

METHOD FOR PRODUCING SHATTERED PRESERVATIVE-FREE DRIED FRUIT OR VEGETABLE PIECES

Cross-reference to Related Application

This application is a continuation-in-part of U.S. application Ser. No. 08/891,770, filed on Jul. 14, 1997.

FIELD OF THE INVENTION

This invention relates to a method and apparatus for producing shattered, dried, preservative-free pieces of edible plant material (fruit pieces or vegetable pieces). In particular, the invention relates to a method and apparatus for producing shattered, preservative-free dried fruit (or vegetable) pieces with a random shaped appearance that do not tend to absorb moisture and lose their integrity quickly.

BACKGROUND OF THE INVENTION

Throughout this specification (including in the claims), the expression "edible plant material" is used to denote edible fruit or vegetable material, and "pieces of edible plant material" denotes edible fruit pieces or edible vegetable pieces.

Small dried fruit pieces are a popular industrial food ingredient used in baking, trail mixes and cereal applications.

Conventional dried fruit pieces are often sticky and tend to clump together unless coated with cornstarch, vegetable oil or other non-stick coating agents. Fruit pieces without preservatives are difficult to store at moisture contents greater than 25% because of the increased risks of yeast and mold growth. At moisture contents below 25% there is generally not enough free water to support growth of yeast and mold.

One method of manufacturing fruit pieces is to form ground fruit paste into strips, and dice or cut the strips into square or rectangular bits. Another method entails blending and extruding finely ground or chopped diced fruit with functional ingredients (which can include colors and flavors) and coating the resulting pieces with non-stick coatings to prevent clumping. However, both of these methods produce pieces that tend to absorb moisture and lose their integrity rapidly.

U.S. Pat. No. 4,948,679, issued Aug. 14, 1996, discloses a process for freezing and thawing and then vacuum drying fruits and vegetables to produce crispy and tender puffed food products.

An English language abstract of Japanese patent application 58134942A discloses a method of processing fruit by rapid freezing at low temperature, pulverizing the fruit at low temperature and defrosting the pulverized fruit with the addition of gum arabic and/or sugar. Although useful in jams and jellies, pulverized fruit particles are too small to be useful as a snack food item or as an ingredient where larger particulates are desired. In addition, pulverized fruit particles, when molded, diced, or otherwise formed into larger pieces, tend to absorb moisture and lose their integrity rapidly.

It would be advantageous to have a process for producing preservative-free shattered fruit (or vegetable) pieces that have a useful size and a random shaped appearance, and do not tend to absorb moisture and lose their integrity as quickly.

SUMMARY OF THE INVENTION

Preferred embodiments of the present invention are methods for producing shattered, dried, preservative-free pieces of edible plant material (fruit pieces or vegetable pieces). In the first step of a first embodiment of such a method, low moisture (22–30%) fruit is cryogenically frozen (e.g., by immersion in liquid nitrogen for a period of approximately 5–15 minutes, preferably 12 minutes, or with $CO_2$ snow). In the second step, the frozen fruit is impacted to break the fruit into useful-sized frozen pieces (preferably having size primarily in the range ¼ inch to ⅜ inch, in the sense that most or all of them have size not greater than ⅜ inch and not less than ¼ inch). A third step is then performed if the pieces resulting from the second step have a moisture content greater than 25% (or if an undesirably large amount of moisture would condense on the pieces from ambient atmosphere, during thawing in the ambient atmosphere at room temperature). In the third step, the frozen fruit pieces are warmed and dried (or warmed in a dry environment) to produce thawed pieces having moisture content in the range from 22% to 25% (by weight).

In one implementation of the first embodiment of the inventive method, the frozen fruit is crushed between rollers of a dual pass roller mill during the second step of the process. In another implementation of the first embodiment, the frozen fruit is shattered in a rotating tumbler during the second step of the process. In a third implementation of the first embodiment, the frozen fruit pieces are warmed in a drier at temperatures between 150° F. and 180° F. in the third step of the process. In some implementations of the first embodiment, the fruit is selected from the group consisting of prunes, raisins, dried pears, dried peaches, dried apricots, dried apples, dried nectarines, dried figs, and dried dates.

In other implementations of the first embodiment, edible vegetable material (e.g., carrots, squash, zucchini, potatoes, broccoli, onions, cauliflower, celery, or peppers) is substituted for fruit.

In another embodiment, the invention is a method for producing shattered prunes, comprising, in order, the steps: a) increasing the moisture content of dried prunes to 26–30%, preferably 28–29%, to produce low moisture prunes; b) pitting the prunes; c) cryogenically freezing the low moisture pitted prunes to form frozen prunes; d) impacting the frozen pitted prunes with a dual pass roller mill to form primarily ¼ to ⅜ inch frozen fruit pieces; and e) warming the frozen prune pieces to maintain or reduce the moisture content to 22–25% prior to storage (if the frozen fruit pieces have a moisture content greater than 25% upon completion of step d) or if an undesirably large amount of moisture would condense on the pieces from the ambient air during thawing in the ambient air at room temperature). An undesirably large amount of moisture should not be allowed to condense on the pieces from the ambient air during thawing.

Another aspect of the invention is an apparatus for implementing any embodiment of the inventive method.

BRIEF DESCRIPTION OF THE DRAWINGS

FIG. 3 is a simplified plan view of a variation on the FIG. 2 apparatus, which omits the warming unit and which instead is used to seal shattered frozen pieces in moisture vapor barrier film bags (so that the bagged pieces can later undergo slow unassisted warming without exposure to ambient atmospheric moisture).

FIG. 4 is a simplified side view of a dual pass roller mill for use in the FIG. 1 system.

DETAILED DESCRIPTION OF THE INVENTION

In preferred embodiments, the present invention is a method of producing shattered, dried, fruit pieces by freezing fruit (preferably low moisture fruit) and impacting the frozen fruit, e.g. with a dual pass roller mill or in a tumbler, to produce randomized fruit pieces. The resulting frozen fruit pieces are preferably at least primarily ¼ to ⅜ inches in size, in the sense that most (or all) of them have size not greater than ⅜ inch and not less than ¼ inch.

In a first embodiment, fruit (for example pears, apricots, peaches, or nectarines) is harvested, cut in half, pitted and dried to a moisture content of 22–30% before being frozen in accordance with the invention. In another embodiment, fruit (preferably prunes) is harvested, dried (eg., to have water content in the range of 16–18%), rehydrated to a moisture content of 22–30% and then pitted (before being frozen in accordance with the invention). When the fruit are whole prunes, they are preferably rehydrated to have moisture content in the range of 23–25%. Except when a tumbler is to be used to shatter the frozen fruit (as described below), it is essential that all of the pit material is removed from the fruit prior to further processing in accordance with the invention. We use the term "fruit" to denote the fruit of a single type or a mixture of several types of fruit.

The low moisture (22–30%) fruit are then frozen (e.g., by immersion in liquid nitrogen or liquid oxygen, or with $CO_2$ snow). Preferably, the frozen fruit are then transferred to an equilibration chamber to allow the temperature of the fruit to equilibrate. Next, the temperature equilibrated frozen fruit are impacted using a dual pass roller mill to form shattered fruit pieces (primarily of ¼ to ⅜ inches in size, in preferred implementations). In preferred implementations, the shattered, frozen fruit pieces are then immediately warmed (in a dry environment) by a warm air dryer at from 150–180° F. for about 20 minutes to thaw the frozen pieces and maintain or reduce the moisture content of the thawed fruit pieces to the desired level (typically about 25% by weight).

Figure 1:
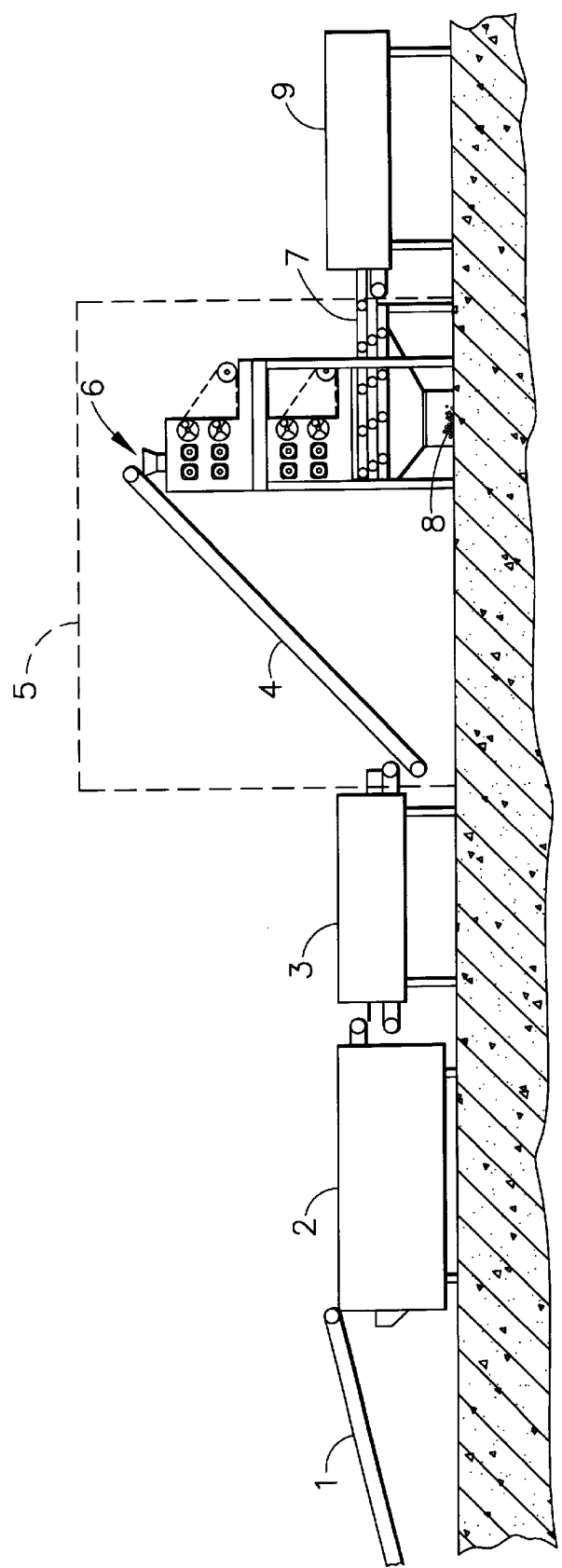
FIG. 1 is a simplified side view of an apparatus (including a dual pass roller mill) for producing shattered, dried, fruit pieces in accordance with the invention.

FIG. 1 is a schematic diagram of a system for producing shattered frozen fruit pieces in accordance with the invention. In FIG. 1, the low moisture fruit is loaded onto a feed and inspection conveyor 1 and transferred by conveyor 1 to cryogenic freezer 2 for freezing. Cryogenic freezer 2 freezes the fruit by means of liquid nitrogen (or liquid oxygen, $CO_2$ snow, other cryogenic means). Preferably, freezer 2 freezes the fruit by immersing it in liquid nitrogen. The frozen fruit is transferred from freezer 2 to an equilibration chamber 3 where the frozen fruit is allowed to temperature equilibrate at a temperature in the range −55° F. to −80° F. The temperature equilibrated fruit is passed from equilibration chamber 3 to an elevating conveyor 4 inside a cold room 5. The cold room is cooled with an air conditioner to a temperature in the range of 32–40° F. The air conditioner serves to reduce the moisture content and the temperature of the cold room. The elevating conveyor 4 transfers the frozen pieces to a dual pass roller mill 6 that is also inside the cold room. Dual pass roller mill 6 breaks the frozen fruit into pieces (primarily pieces of size in the range from ¼ inch to ⅜ inch) which are then passed through a grading shaker 7.

Dual pass roller mill 6 includes two sets of rollers: an upper set in the upper housing shown in FIG. 1 immediately below the upper end of conveyor 4; and a lower set in the lower housing shown in FIG. 1 below the upper housing and above grading shaker 7. The fruit falling from the conveyor 4 initially passes between rollers of the upper set, and the pieces emerging from the upper set of rollers then pass between the rollers of the lower set. Since the separation between the rollers in the first set is controllable independently from the separation between the rollers in the second set, the interroller separations can be set to maximize the number of fruit pieces having size in the desired range while minimizing the number of pieces having size outside this range. For typical applications, it is preferable to set the separation between the rollers in the first set (the set first encountered by the frozen fruit) to be greater than the separation between the rollers in the set encountered second by the fruit, since such a configuration minimizes the ratio of fine material (pieces of size below the lower end of the desired size range) to adequately sized material produced as a result of processing by both sets of rollers.

FIG. 4 is a simplified side view of a preferred implementation of dual pass roller mill 6 of FIG. 1 which includes two sets of rollers: the upper set comprising counter-rotating rollers 60 and 61; and the lower set comprising counter-rotating rollers 62 and 63. The frozen fruit falling from conveyor 4 initially passes between counter-rotating rollers 60 and 61, the pieces emerging from between rollers 60 and 61 then pass between counter-rotating rollers 62 and 63, and the pieces emerging from between rollers 62 and 63 then fall onto grading shaker 7. The separation between rollers 60 and 61 is greater than the separation between rollers 62 and 63.

With reference to FIG. 1, in grading shaker 7, fine material of size less than ⅛ inch is separated out as fines 8. Fruit material larger than ⅜ inch is screened out and recycled back through dual pass roller mill 6. Shaker 7 passes correctly sized pieces (of size in the range ⅛ inch to ⅜ inch) to warmer 9. Dual pass roller mill 6 is preferably configured so that these correctly sized pieces are at least primarily in the range from ¼ inch to ⅜ inch in the sense that most or all the pieces passed to warmer 9 have size not greater than ⅜ inch and not less than ¼ inch. Warmer 9 warms and dries the pieces therein (preferably while the pieces pass therethrough) at temperatures between 150° F. and 180° F. (typically for about 20 minutes) so that the fruit pieces emerging from warmer 9 have thawed and reached a moisture content of 25%. The thawed, dried fruit pieces are then packaged.

The described embodiment of the invention is based on the inventor's recognition that useful dried, room-temperature fruit pieces having a desirable random shaped appearance and a desirable distribution of sizes (most having size in the range from ¼ inch to ⅜ inch) can be produced by impacting frozen fruit (without producing an undesirably large amount of fines), and the inventor's recognition that a dual pass roller mill is useful to produce such pieces since with a relatively large separation between the rollers performing the first pass of a dual pass operation and a relatively small separation between the rollers performing the second pass of the dual pass operation, frozen fruit pieces can be produced with a size distribution including a relatively larger number of pieces in the range from ¼ inch to ⅜ inch and a relatively smaller number of fines than could be produced by passing the frozen fruit once through a single pass roller mill (with a relatively small separation between the rollers).

The following example is another embodiment of the inventive method.

EXAMPLE 1

Plums are harvested (typically with moisture content of about 80%). The plums are then dried to 16–17% moisture in a 180° F. drier to form low moisture, dried, whole prunes. Dried prunes generally can be stored for at least 24 months so long as they are not exposed to moisture and infestation since their water content is generally too low to support the growth of fungi and bacteria.

In order to pit the dried whole prunes, the prunes are first washed and steamed to cook and tenderize them. In steaming the prunes, the moisture content of the prunes is increased to 22–30% (preferably 23–25%) to increase pitting efficiency. The hot, steamed prunes are then pitted with an automatic prune pitter and sorted to remove any remaining pits. In all embodiments of the invention in which prunes are processed (except embodiments employing a tumbler to shatter the frozen fruit), it is essential that all of the pit material is removed.

The pitted prunes (preferably with 23–25% moisture content) are immersed in liquid nitrogen (or blanketed with $CO_2$ snow) to reduce the temperature of the dried fruit to around −55 to −80° F. The frozen prunes are transferred to an equilibration chamber until the temperature of the frozen prunes equilibrates throughout the fruit, generally about 5 minutes at −55 to −80° F. The frozen prunes are then impacted in a heavy duty dual pass roller mill to break the fruit primarily into ¼ to ⅜ inch pieces.

Alternatively, the frozen prunes can be impacted with a device such as a hammer mill to break the fruit into small pieces. However, this alternative process dramatically increases the fines.

While still frozen, the fine material ($\leq$⅛ inch) is separated out and material larger than ⅜ inch is screened and recycled through the roller mill. Correctly sized pieces are then thawed to ambient temperature (while being dried or prevented from becoming moistened by condensation). Preferably the moisture-controlled thawing (or combined thawing and drying) is accomplished in a drier at temperatures less than 180° F. for about 20 minutes to reduce the moisture content to 25% (or maintain the moisture content at 25%) and then packaged.

It is imperative that moisture from ambient air is not allowed to condense on the cold surface of the shattered prune pieces during thawing. The prune pieces are preferably warmed and dried prior to packaging to minimize condensation since free moisture encourages yeast and mold growth in areas where prune sugars are diluted. A warming tumbler or drier with circulating air is preferably used (during thawing) to evaporate any condensed moisture prior to packaging.

An aspect of the invention is the above-described apparatus of FIGS. 1 and 4.

Other aspects of the invention are the apparatus to be described below with reference to FIGS. 2 and 3, and the method performed during operation of each such apparatus.

Figure 2:
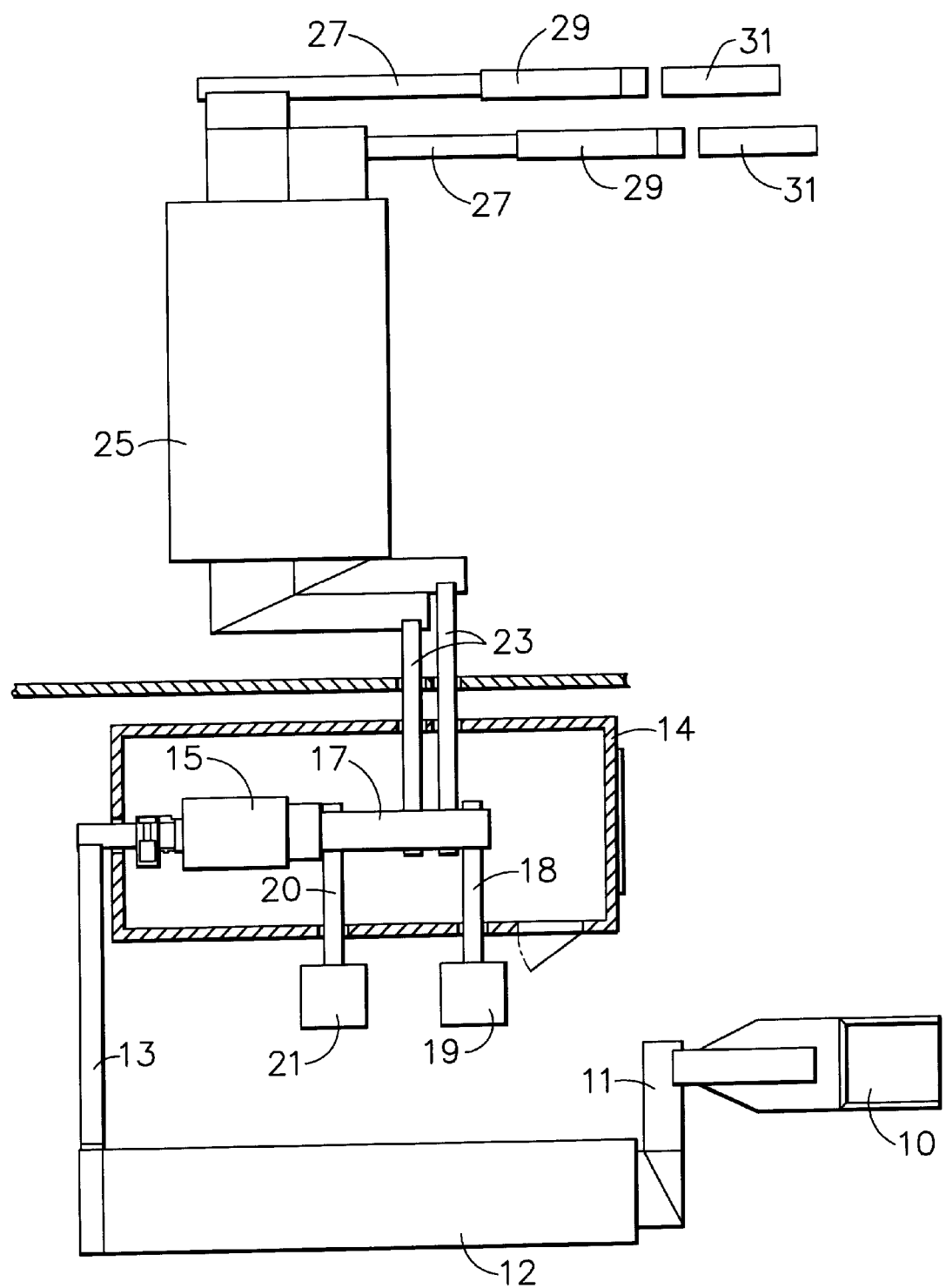
FIG. 2 is a simplified plan view of an apparatus (including a tumbler for shattering frozen fruit, and a warming unit) for producing shattered, dried fruit pieces in accordance with the invention.

FIG. 2 is a schematic diagram of an apparatus (including tumbler 15 for shattering frozen fruit or vegetables, and warming unit 25) for producing shattered, dried fruit (or vegetable) pieces in accordance with the invention. Tumbler 15 is used rather than a dual pass roller mill, as in the FIG. 1 embodiment. Although we will describe FIG. 2 and its operating method in the context of processing fruit (for convenience), it should be understood that the FIG. 2 apparatus can also be used to process vegetables in accordance with the invention.

With reference to FIG. 2, the dried fruit to be processed is loaded into hopper 10, and routed by conveyor 11 from hopper 10 to cryogenic freezer 12. Preferably, cryogenic freezer 12 freezes the fruit by immersing it liquid nitrogen (but freezer 12 can alternatively cryogenically freeze the fruit by other means, such as by means of $CO_2$ snow). The inventor has recognized that when dried fruit is (or vegetables are) cryogenically frozen in liquid nitrogen the fruit (vegetables) can be shattered successfully either in a tumbler or with a roller mill (with the tumbler typically accomplishing the shattering operation more gently than the roller mill).

Immersion in liquid nitrogen is the preferred method of freezing the edible product to be processed, due to its efficiency and ease of handling. To freeze prunes and other dried fruit such as apricots, peaches, nectarines, and pears, immersion in liquid nitrogen in freezer 12 for approximately five minutes (immediately prior to tumbling in tumbler 15) is typically adequate. Vegetables such as broccoli, cauliflower and carrots require the same or similar treatment. For whole large onions, however, immersion in liquid nitrogen for at least 12 to 15 minutes is typically needed for thorough freezing (this is believed to be due to the insulating effect of air spaces between the many layers in an onion).

In the FIG. 2 apparatus, conveyor 13 transports the frozen fruit from freezer 12 to tumbler 15. As tumbler 15 rotates, it shatters the frozen fruit into pieces (typically more gently than would the dual pass roller mill in the FIG. 1 embodiment). One advantage of utilizing tumbler 15 to shatter frozen fruit (with the tumbler rotating at low rotational speed, and with rapid transit time through the tumbler), is that the tumbler produces frozen fruit pieces having a more favorable size distribution (relatively more adequately sized pieces, and fewer fines) than a roller mill typically does.

Tests of the FIG. 2 apparatus have been conducted with a generally cylindrical implementation of tumbler 15 (of five foot length along its longitudinal axis and three foot diameter), at rotational speeds of 7 rpm and 15 rpm and tilts of 1" and 2" tilt (along the longitudinal axis from the inlet to the outlet of the tumbler). The inventor has concluded from the tests that tumbler operation at a speed of 7 rpm results in a more favorable size distribution of frozen fruit pieces (relatively more larger pieces and fewer fines) than operation at 15 rpm, regardless of whether the tumbler is set at 1" or 2" of tilt. Rotational speed of the tumbler is believed to be the most critical parameter affecting performance.

Another advantage of shattering prunes (or other fruits or vegetables) by tumbling (rather than by impacting in a roller mill) is that whole prunes containing pits (or other fruits or vegetables containing pits or seeds) can be processed as well as pitted prunes (or other fruits or vegetables from which the pits or seeds have been removed). Frozen pits do not shatter in a tumbler (operated with typical parameters) but instead tend to remain intact, except for a small percentage of split pits that naturally occur to varying degrees from one crop year to the next. These whole and split pits can be successfully screened out of the shattered product due to their large relative size. In contrast, use of a roller mill to shatter whole prunes (with pits) typically crushes some pits into fragments that are very difficult to detect and remove. Since the cost of whole prunes is significantly less than pitted ones, use of whole prunes for processing in accordance with invention considerably reduces production costs. Using whole prunes (rather than pitted prunes) does, however, typically result in somewhat smaller pieces and slightly more fines.

Still with reference to FIG. 2, shattered fruit or vegetable pieces that emerge at the outlet of tumbler 15 are graded by shaking grader 17 whose parameters are set to pass (to conveyors 23) pieces of size in a desired range. Pits and excessively large pieces are accumulated in hopper 19. Fines (excessively small pieces, typically of size less than ⅛ inch) are transported by conveyor 20 to hopper 21. Pits and oversized pieces are transported by conveyor 18 out of enclosure 14 to hopper 19. Tumbler 15 and grader 17 are installed within insulated enclosure 14, which is maintained at a cold temperature (far below room temperature).

Conveyors 23 transport the frozen pieces having size in the desired range from shaker 17 to warming unit 25. Unit 25 is preferably a warm circulating air tunnel or gentle tumbler, which provides a warm, dry environment through which the pieces pass slowly. Unit 25 causes (by active heating) or allows (passively) the temperature of the pieces to rise to ambient temperature (room temperature), while preventing condensation on the pieces as they thaw.

Whether using a roller mill or a tumbler for shattering frozen fruit or vegetable pieces, there is a persistent problem of preventing moisture condensation on the frozen shattered product as it warms. This is a critical obstacle that must be overcome to prevent an increase in product moisture that can cause subsequent spoilage and extreme undesirable stickiness.

The thawed pieces emerging from the outlet of warming unit 25 are transported by elevating conveyors 27 to weighing and bagging units 29. Units 29 load appropriate, weighed amounts of the thawed pieces into bags. The bags are then sealed at bag sealing units 31.

FIG. 3 is a schematic diagram of a variation on the FIG. 2 apparatus, which omits the warming unit and which instead is used to seal shattered frozen pieces in moisture vapor barrier film bags (so that the bagged pieces can later undergo slow unassisted warming without exposure to ambient atmospheric moisture).

Elements 10, 11, 12, 13, 14, 15, 17, 19, 20, and 21 of FIG. 3 are identical to the identically numbered, above-described elements of FIG. 2, and the description thereof will not be repeated.

Conveyors 123 transport the frozen pieces having size in the desired range from shaker 17 to elevating conveyors 127. Conveyors 127 transport the still-frozen pieces to weighing and bagging units 129. Units 129 load appropriate, weighed amounts of the thawed pieces into moisture vapor barrier film bags. These bags are then sealed at bag sealing units 131. The moisture vapor barrier film bags prevent moisture from condensing on the bagged pieces, so that the bagged frozen pieces can later undergo slow unassisted thawing without exposure to ambient atmospheric moisture.

In each embodiment of the invention, size separation of shattered pieces (including pit removal in cases in which whole fruit is processed, and fines removal) is best performed while the shattered pieces, fines, and pits are still frozen. This is because, in the frozen state, the product exhibits absolutely no sticky characteristics which would greatly impair their segregation. Post-thawing size separation, even after ideal warming and thawing, would typically be hampered by some degree of sticking of the pieces to themselves and to the sizing screens. Therefore, it is preferred that all sizing steps are performed by equipment inside a cold box (e.g., within enclosure 14). Once the shattered pieces are passed outside the cold box into the space (e.g., room) containing the packaging equipment, it is preferred that such space is maintained at low humidity (and that it is equipped with dehumidification means). Typically, the humidity in the packaging space should be maintained at less than 30% relative humidity, to minimize moisture condensation onto the product.

Alternative embodiments of the invention are variations on the above-described methods (e.g., the operating methods of the described apparatus) in which shattered vegetable pieces (rather than shattered dried fruit pieces) are produced. Examples of vegetables that can be processed in accordance with such embodiments include carrots, squash, broccoli, cauliflower, onions, zucchini, potatoes, celery, and peppers. Vegetables generally have a low sugar content and are not as sticky as fruit. In implementing vegetable-processing embodiments, one or more vegetables are frozen (if necessary after a preliminary step in which the moisture content of each vegetable has been reduced to the range of 22%–25%), and then impacted (for example, using a roller mill or tumbler) to shatter the frozen vegetable material into pieces. Many vegetables can be frozen fresh (without drying) and than shattered in accordance with the invention. The frozen pieces can then be dried (or thawed and dried, e.g., in a warm air drier) to maintain or reduce their moisture content (e.g., to 22%–25%) for preservation.

The moisture specifications for dried fruit processed (or to be processed) by the apparatus of FIG. 2 or 3 are the same as for dried fruit processed (or to be processed) by the FIG. 1 apparatus. The moisture content of vegetables to be processed by any embodiment of the invention will typically be same as that found in the fresh product, especially where there is no partially dried version of the vegetable (having moisture content in a range similar to the moisture content range of dried fruit) which is commercially available as raw material. Alternatively, freeze dried vegetables can be processed in accordance with the invention. The moisture content of the thawed, shattered vegetable pieces resulting from preferred embodiments of the invention should be not greater than 25%.

It should be understood that (regardless of whether fruit or vegetables are being processed), the preferred implementation of the final thawing and/or drying step of the invention depends on the moisture content of the frozen shattered pieces that have been produced and are to be thawed. If the moisture content of the frozen pieces is above the desired level (e.g., above 25%), the final thawing and/or drying step should include active drying (e.g., in warmer 9 of FIG. 1 or warming unit 25 of FIG. 2) until the pieces have been thawed and dried to the desired moisture content (typically 22%–25% moisture by weight). If the moisture content of the frozen pieces is in the desired range (e.g., 22%–25%), the final thawing and/or drying step can either consist of: active thawing (e.g., thawing the frozen pieces in a heated dryer in such a manner that their moisture content is prevented from increasing above 25% due to condensation thereon of moisture from ambient air during thawing); or packaging in moisture vapor barrier film bags (e.g., as in units 129 of FIG. 3) or other moisture-sealed containers and then passively allowing the sealed pieces to thaw by keeping them at room temperature; or allowing the pieces to thaw (at room temperature) in a dry environment whose humidity is sufficiently low that it prevents undesirable moisture condensation on the pieces during thawing.

The advantages of the inventive method and apparatus are both aesthetic and functional. The random shaped appearance of the fruit pieces presents a more natural ingredient image which is preferred to the angular (and more uniform) shape created by dicing. The shattered product of the invention is also free flowing and each piece is firm. The functional advantage of a free flowing product is that it allows more trouble free blending and can reduce or eliminate the need for non-stick additives. In contrast to ground fruit paste that has been diced into regular shaped pieces or "bits", the shattered fruit pieces of this invention do not tend to absorb moisture and lose their integrity quickly. The inventive method of size reduction also does not produce objectionable long strips of fruit skin as does standard dicing techniques. The inventive method also produces dried fruit pieces that can be stored without preservatives.

Although preferred embodiments of the invention have been described, modifications of the described methods and apparatus for preparing shattered pieces of edible plant material (dried fruit pieces or vegetable pieces) will be apparent to those skilled in the art and modifications which include such features are therefore considered to be within the scope of the appended claims.

What is claimed is:

1. A process for producing shattered edible plant material comprising the steps of:
   a) freezing edible plant material having a moisture content of 22%–30% to form frozen plant material; and
   b) forming frozen pieces of edible plant material having a size not greater than ⅜ inch and not less than ¼ inch by impacting the frozen plant material to break said frozen plant material into said frozen pieces of edible plant material.

2. The process of claim 1, wherein the frozen pieces have a moisture content greater than 25% after step b), and also including the step of:
   c) after step b), warming and drying the frozen pieces to produce thawed dried edible plant material pieces having a moisture content of 22%–25%.

3. The process of claim 2, wherein the frozen pieces are dried in a warming tumbler in the presence of circulating air during step c).

4. The process of claim 2, wherein the frozen pieces are dried in a warm air drier during step c).

5. The process of claim 4, wherein the warm air drier dries the frozen pieces at a temperature in the range from 150° F. to 180° F.

6. The process of claim 1, wherein the edible plant material is frozen using $CO_2$ snow during step a).

7. The process of claim 6, wherein the edible plant material is frozen in $CO_2$ snow for 10 to 14 minutes during step a).

8. The process of claim 1, wherein the edible plant material is frozen in liquid nitrogen during step a).

9. The process of claim 1, wherein the edible plant material is frozen in liquid oxygen during step a).

10. The process of claim 1, wherein the frozen plant material is impacted by a dual pass roller mill during step b) and those of the frozen pieces having size larger than ⅜ inch after passing through the roller mill are recycled back through said roller mill.

11. The process of claim 1, wherein the frozen plant material is impacted by passing through a rotating tumbler during step b).

12. The process of claim 11, wherein the frozen plant material is pit-containing fruit.

13. The process of claim 1, wherein the edible plant material is fruit.

14. The process of claim 13, wherein the edible plant material is pitted fruit selected from the group consisting of prunes, pears, peaches, apricots, apples, figs, dates, raisins and nectarines.

15. The process of claim 13, wherein the edible plant material is pitted fruit selected from the group consisting of pears, peaches, apricots, apples, figs, dates, raisins and nectarines and the moisture content of the fruit frozen in step a) is 22–25%.

16. The process of claim 1, wherein the edible plant material is vegetable material.

17. The process of claim 1, wherein the edible plant material is at least one vegetable selected from the group consisting of broccoli, cauliflower, carrots, celery, onions, squash, zucchini, potatoes, and peppers.

18. The process of claim 1, also including the steps of:
   c) after step b), producing a sorted subset of the frozen pieces by separating from the frozen pieces those of size greater than ⅜ inch and less than ⅛ inch; and
   d) after step c), thawing the sorted subset of the frozen pieces to produce thawed dried pieces of the edible plant material.

19. The process of claim 18, wherein the frozen pieces have a moisture content greater than 25% after step c), and wherein step d) includes the step of:
   warming and drying the sorted subset of the frozen pieces to produce the thawed dried fruit pieces such that said thawed dried fruit pieces have a moisture content of 22%–25%.

20. The process of claim 1, also including the step of:
   c) after step b), loading quantities of the frozen pieces into moisture vapor barrier film bags, so that the frozen pieces can later thaw within the bags while the bags prevent moisture outside the bags from condensing on the pieces in the bags during thawing.

21. The process of claim 1, also including the steps of:
   c) after step b), producing a sorted subset of the frozen pieces by separating from the frozen pieces those of size greater than ⅜ inch and less than ⅛ inch,
   d) after step c), loading quantities of the sorted subset of the frozen pieces into moisture vapor barrier film bags, so that said frozen pieces can later thaw within the bags while the bags prevent moisture outside the bags from condensing on the pieces in the bags during thawing.

22. A process for producing shattered, dried, fruit, comprising the steps of:
   a) increasing the moisture content of dried fruit to 22%–30% to produce low moisture fruit;
   b) freezing the low moisture fruit to form frozen fruit;
   c) impacting the frozen fruit to form frozen fruit pieces; and
   d) warming the frozen fruit pieces to thaw said frozen fruit pieces and decrease their moisture content to 22%–25% prior to storage.

23. The process of claim 22, wherein the low moisture fruit is frozen using $CO_2$ snow during step b).

24. The process of claim 23, wherein the fruit are frozen in $CO_2$ snow for 10 to 14 minutes during step b).

25. The process of claim 22, wherein the fruit are frozen in liquid nitrogen or in liquid oxygen during step b).

26. The process of claim 25, wherein the fruit are frozen in liquid nitrogen for 10 to 14 minutes during step b).

27. The process of claim 22, wherein the frozen fruit are impacted by a dual pass roller mill during step c).

28. The process of claim 22, wherein the frozen fruit are impacted by passing through a rotating tumbler during step c).

29. The process of claim 28, wherein the frozen fruit is pit-containing fruit.

30. The process of claim 22, wherein the frozen fruit pieces are warmed in a warm air drier during step d).

31. The process of claim 30, wherein the warm air drier warms the frozen fruit pieces at a temperature in the range of from 150° F. to 180° F.

32. The process of claim 22, wherein the fruit is pitted fruit selected from the group consisting of prunes, pears, peaches, apricots, apples, figs, dates, raisins and nectarines.

33. The process of claim 22, wherein the fruit is pitted prunes and the moisture content of the prunes of step a) is 23–25%.

34. The process of claim 22, wherein step c) further includes forming frozen fruit pieces having a size not greater than 3/8 inch and not less than 1/4 inch.

35. A process for producing shattered, dried fruit, comprising the steps of:
 a) freezing fruit having a moisture content less than 30% but greater than 25% to form frozen fruit;
 b) impacting the frozen fruit to break the fruit into frozen fruit pieces; and
 c) warming and drying the frozen fruit pieces to produced thawed dried fruit pieces having moisture content not more than 25% but not less than 22%.

36. The process of claim 35, wherein the frozen fruit pieces are dried in a warming tumbler in the presence of circulating air during step c).

37. The process of claim 36, wherein the warming tumbler dries the frozen fruit pieces at a temperature in the range from 150° F. to 180° F. during step c).

38. A process for producing a shattered, dried vegetable product, comprising the steps of:
 a) impacting frozen vegetables to break them into frozen vegetable pieces; and
 b) warming and drying the frozen vegetable pieces to produced thawed dried vegetable pieces having moisture content not more than 25% but not less than 22%.

39. The process of claim 38, wherein the frozen vegetable pieces are dried in a warming tumbler in the presence of circulating air during step b).

40. The process of claim 38, wherein the frozen vegetables are impacted by a dual pass roller mill during step a) and those of the frozen vegetable pieces having size larger than 3/8 inch after passing through the roller mill are recycled back through said roller mill.

41. The process of claim 40, wherein step a) is performed such that most of the frozen vegetable pieces have size greater than 1/4 inch.

42. The process of claim 38, wherein the frozen vegetables are impacted by passing through a rotating tumbler during step a).

43. The process of claim 42, wherein the frozen vegetables are seed-containing vegetables.

44. The process of claim 35 wherein step b) further includes forming frozen fruit pieces having a size not greater than 3/8 inch and not less than 1/4 inch.

* * * * *